G. G. POWELL.
CANE CUTTING MACHINE.
APPLICATION FILED DEC. 15, 1919.
1,387,511.
Patented Aug. 16, 1921.
3 SHEETS—SHEET 2.
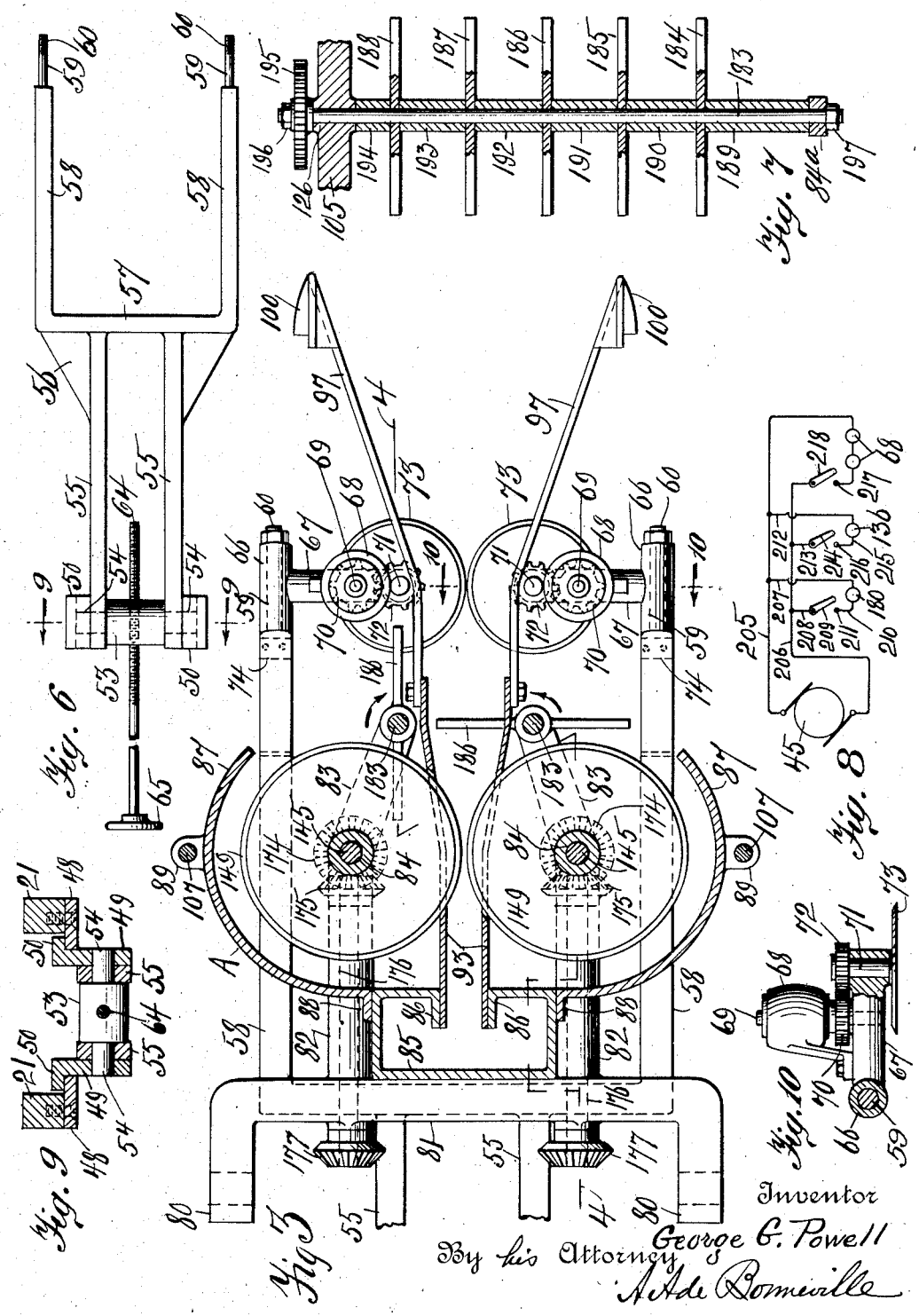
Inventor
George G. Powell
By his Attorney
A. H. de Bomeville G. G. POWELL.
CANE CUTTING MACHINE.
APPLICATION FILED DEC. 15, 1919.
1,387,511.
Patented Aug. 16, 1921.
3 SHEETS—SHEET 3.
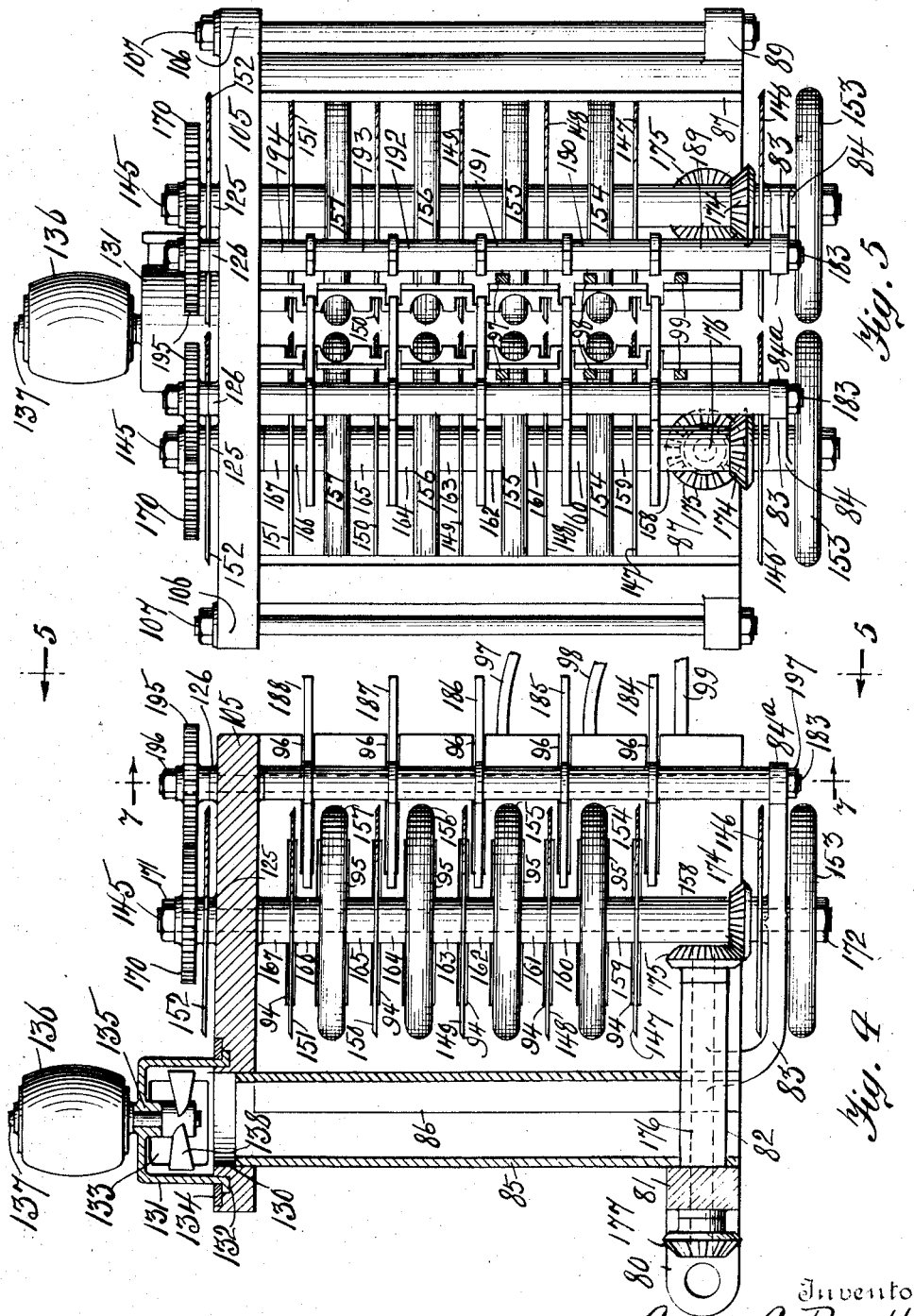
Inventor
George G. Powell
By his Attorney

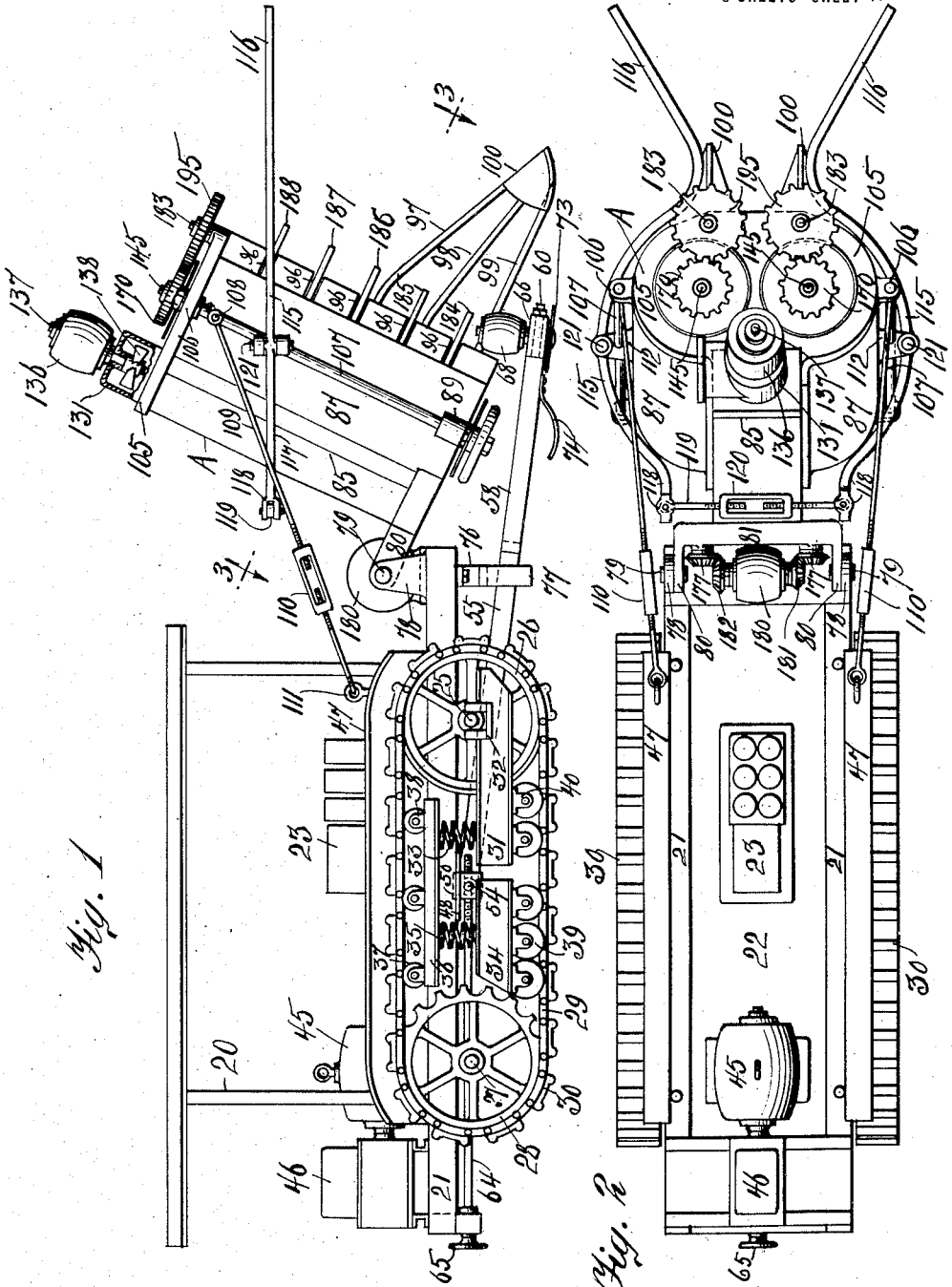

UNITED STATES PATENT OFFICE.

GEORGE G. POWELL, OF NEW YORK, N. Y., ASSIGNOR TO ANTOINETTE M. POWELL, OF NEW YORK, N. Y.

CANE-CUTTING MACHINE.

1,387,511. Specification of Letters Patent. Patented Aug. 16, 1921.

Application filed December 15, 1919. Serial No. 344,808.

*To all whom it may concern:*

Be it known that I, GEORGE G. POWELL, citizen of the United States and resident of the borough of Bronx, city of New York, in the county of New York and State of New York, have invented certain new and useful Improvements in Cane-Cutting Machines, of which the following is a specification.

This invention relates to a cane cutting machine, and its object is the production of a machine which operates on a cane row either at one side or through any portion of a field thereof. The machine severs the cane stalks from the trash, which latter remains outside of the machine. The cane is cut in proper lengths and separated from any extraneous matter that may be connected therewith.

The main object of this invention is the production of a cane cutting machine which eliminates the heretofore necessity of recognizing the individual stalks of cane, their varying heights and the points at which each stalk should be topped. The machine cuts the stalks into short lengths, ignoring the varying topping points of the stalks. By means of a plurality of cutters, the topping of both long and short lengths of stalks or fallen stalks, is secured at proper locations with more accuracy than can be accomplished by topping by hand. The cutters of the machine coact with driving means therein to force cut portions of the stalks with their leaves at the various levels of the cutters, one over the other.

Figure 1 shows a side elevation of an exemplification of the cane cutting machine; Fig. 2 represents a top plan view of Fig. 1; Fig. 3 is an enlarged section of Fig. 1 on the line 3, 3; Fig. 4 shows an enlarged section of Fig. 3 on the line 4, 4; Fig. 5 represents a right hand side view and section of Fig. 4 on the line 5, 5; Fig. 6 is an enlarged top plan view of a ground cutter support of the machine; Fig. 7 shows a partial section of Fig. 4 on the line 7, 7; Fig. 8 shows a wiring diagram of the machine, Fig. 9 shows a section as on the line 9, 9 of Fig. 6 and Fig. 10 shows a section of Fig. 3 on the line 10, 10.

A caterpillar tractor is indicated in its entirety by the numeral 20 and is shown with a platform having the longitudinal side beams 21, between which is indicated the floor 22. A motor 23, in this instance an internal combustion engine, is supported on the floor 22. The tractor is shown to comprise the usual front shaft 25, with the driving sprocket wheels 26 and the idler shaft 27 with the idler wheels 28. A track 29 has connected thereto the shoes 30. Side bars 31 are connected at one end to journal boxes 32, and at their opposite ends support springs 33. Side bars 34 are fastened to springs 35. Track roller bars 36 are supported on the springs 33 and 35.

Track rollers 37 are journaled in the brackets 38 extending from the bars 36. Track rollers 39 are journaled in brackets 40 extending from the side bars 31 and 34. Suitable connections (not shown) are provided for the motor 23 and the front shaft 25. An electric generator 45 is supported on the floor 22 and is driven by a motor 46, in this instance an internal combustion engine. Mud guards 47 for the tracks 29 are supported at their ends on the side beams 21.

Guide plates 48 are fastened to the lower faces of the side beams 21 and crossheads 49 having the lips 50 are slidably supported on the plates 48.

An oscillating pin 53 has extending therefrom pivots 54 that are supported in journal bearings in the cross heads 49. On the pivots 54 are supported the arms 55 of a ground cutter support 56. A cross piece 57 connects the arms 55 and longitudinal supporting arms 58 extend from said cross piece. Journal pivots 59 with the threaded ends 60 extend from the arms 58. An adjusting screw 64 with the adjusting hand wheel 65 is in threaded engagement with a tapped opening in the pin 53 and thereby the support 56 can be moved longitudinally. On the pivots 59 are supported oscillating sleeves 66, each with an arm 67. Above each of the arms 67 is located an electric motor 68, having the armature shaft 69. The latter shafts are journaled in the arms 67 and have fastened thereto the spur gears 70. Pivots 71 are also journaled in the arms 67 and have fastened thereto the pinions 72 which mesh with the spur gears 70. On each of the pivots 71 and at the lower end thereof is fastened the ground cutter 73. A spring bracket 74 is fastened to the lower face of each of the arms 58. A fork 76 with guide prongs 77 is fastened to the bottom face of each of the side beams 21, and constitutes a guide for its accompanying arm 55 of the support 56.

Brackets 78 extend from the upper faces of the side beams 21. Pivots 79 in the brackets 78 have hinged thereon the journal arms 80 of a bracket 81. The latter with the appurtenances supported therewith is herein designated as a cutter housing and indicated in its entirety by the letter A. Similar journal bearings 82 are formed with the bracket 81. Arms 83 are formed with each of the bearings 82. Bearings 84 and 84ª are formed with each of the arms 83.

A rectangular delivery tube 85 with the flanges 86 is fastened to the bracket 81. A pair of curved casings 87 each with a flange 88 extend from the delivery tube 85. Lugs 89 extend from the casings 87 at the lower portions thereof. Shield plates 93 are fastened at one end to the flanges 86 of the delivery tube 85 and form a vertical longitudinal intake opening therefor. Slots 94, 95 and 96, are formed in the shield plates 93. Sets of diverging gathering arms 97, 98 and 99 have each one end fastened to the forward portions of the shield plates 93. A shoe 100 connects the outer ends of each set of arms. The shoes are spaced apart to form a stalk passage between them when the machine is in operation.

A cover 105 is located upon the top ends of the casings 87. Lugs 106 are formed with said cover 105. Tie rods 107 extend through the lugs 106 and 89 and tie together the cover 105 and casings 87.

A pin 108 extends from each of the tie rods 107. Tie rods 109 with the turnbuckles 110 have each one end connected to one of the pins 108 and their other ends are connected to eyelets 111 extending from the mud guards 47.

The tie rods 107 extend upwardly and forwardly and extend through openings in brackets 112. The latter extend from the curved casings 87. By means of the tie rods 109 and their turnbuckles 110, the cutter housing A can be tilted to different positions. Crowders are indicated in their entirety by the numerals 115. Each crowder at its forward end has formed therewith the diverging portion 116. At the rear ends 117 of the crowders 115 are formed forks 118 for receiving the ends of a tie rod 119 with the turnbuckle 120. A pivot 121 connects the central portion of each crowder with one of the brackets 112. The purpose of the turnbuckle 120 and the pivots 121 is to adjust the diverging portions 116 of the crowders to different positions.

In the cover 105 are formed the journal bearings 125 and 126. A circular opening 130 is formed in cover 105, and a fan housing 131 with the flange 132 and outlet opening 133 covers said opening 130. A ring 134 bears upon the flange 132 to maintain the fan housing 131 in proper position. The said housing 131 can be turned to different angular positions. A bearing 135 is formed in the roof of the fan housing 131. A motor 136 is located over the housing 131 and its armature shaft 137 extends into the fan housing and is supported in the bearing 135.

An exhaust fan 138 in the housing 131 is fastened to the armature shaft 137.

Shafts 145 are journaled in the bearings 84 and 125. On each shaft 145 are fastened the circular cutters 146, 147, 148, 149, 150, 151, 152 and the flexible steadying wheels 153, 154, 155, 156 and 157. The latter may be similar to automobile tires.

Sleeves 158 to 167 are located on each shaft 145 to properly space said circular cutters and flexible wheels.

On the shaft 145 is fastened a spur gear 170. Nuts 171, 172 on the ends of the shafts 145 maintain all the elements on each in proper position. A bevel gear 174 is fastened to each shaft 145 and meshes with a bevel gear 175, that is mounted on a shaft 176 that is journaled in the bearing 82. On each shaft 176 is also fastened a bevel gear 177. A motor 180 is supported on the floor 22 of the tractor. On the ends of the armature shaft of the motor 180 are fastened the bevel gears 181, 182. The latter gears mesh with the gears 177. The axial center line of the armature shaft of the motor 180 is in line with axial center lines of the pivots 79, by means of which the cutter housing A can be swung to different positions.

Shafts 183 are journaled in the bearings 84ª and 126. On each shaft 183 are fastened the feeder arms 184 to 188 inclusive. Sleeves 189 to 194 inclusive are located on each shaft 183 to properly space said feeder arms. A gear 195 is fastened to each shaft 183 and meshes with the gear 170. Nuts 196 and 197 on the ends of each of the shafts 183 maintain the elements thereon in proper position. The slots 94 form clearance spaces for the circular cutters 147 to 151. The slots 95 form clearance spaces for the wheels 154 to 157 and the slots 96 form clearance spaces for the feeder arms 184 to 188.

The wheels and circular cutters on the shafts 145 alternate with each other.

The feeder arms 185, 186, 187 and 188 are each located between a steadying wheel and a circular cutter of the shafts 145, and the feeder arms 184 are located below the circular cutters 147.

Referring to Fig. 8 a diagrammatic view of the electric appurtenances of the machine are indicated. Main line wires 205, 206 have an end each connected to the generator 45. A branch wire 207 connects the wire 205 with the motor 180. A wire 208 extends from the wire 206 and connects with the switch 209. A wire 210 extends from the motor 180 and connects with the switch terminal 211. A wire 212 extends from the wire 205 and leads to the electric motor 136. A wire 213 leads from the wire 206 and connects with the switch 214. A wire 215 leads from the motor 136 and connects with the switch terminal 216. The motors 68 are in series with the wire 205 which latter also leads to the switch terminal 217.

A switch 218 connects with the main line wire 205.

To operate the machine it is located in alinement with one or a plurality of cane rows and upon being propelled the cane stalks are engaged at their top portions by the diverging portions 116 of the crowders 115. The shoes 100 engage the lower portions of the stalks, while the arms 97, 98 and 99 gather the intermediate portions of the stalks. As the stalks of cane are collected by the crowder 115 and the arms 97, 98, 99, their bottom ends are severed by the ground cutters 73. The severed stalks are next forced between the shield plates 93 by the rotations of the feeder arms 184 to 188. The stalks are next forced between the circumferential faces of the steadying wheels 153 to 157 in proper position, to be cut by the circular cutters 146 to 152. The cut stalks now enter the delivery tube 85 and are deposited upon the ground. When the cut stalks are in the delivery tube 85, the exhaust fan 138 draws the leaves and lighter material which has been separated from the stalks to the opening 133 of the casing 131.

In operating the machine the motor 23 drives the complete machine through the rows of cane stalks.

The motor 180 with its coacting gears rotates the shafts 145, whereby the wheels 153 to 157, the circular cutters 146 to 152 and the spur gear 170 are turned. The latter gear turns the gear 195, whereby the shafts 183 are turned. With the shafts 183, feeder arms 184 to 188 turn.

The motor 136 drives the exhaust fan 138. The motors 68 turn the ground cutters 73.

The ground cutters 73 are always maintained at the proper distance from the ground by the flexibility of the springs 74, and the oscillating action of the sleeves 66 on the pivots 59 permits the ground cutters 73 to swing up and down.

The ground cutters can be adjusted in the longitudinal direction of the machine by means of the adjusting screw 64 with its wheel 65.

The ground cutter support 56 swings on the pivots 54 and the sleeves 66 swing on the pivots 59, by means of which the ground cutters 73 can swing to follow the contour of the ground as the machine is moved.

Having described my invention what I desire to secure by Letters Patent and claim is:

1. In a machine of the character described the combination of a cutter housing, a delivery tube in the housing, shafts journaled in the housing, means to rotate the shafts, feeder arms fastened to each of said shafts, shield plates in the cutter housing leading to an opening in the delivery tube, a set of diverging gathering arms extending forwardly from each shield plate and a shoe connected to the forward end of each set of arms.

2. In a machine of the character described the combination of a platform, a cutter housing hinged to the platform, a pair of shafts journaled in the housing, flexible steadying wheels and circular cutters fastened to each shaft, means to rotate the shafts and means to deliver cane stalks to said wheels and cutters.

3. In a machine of the character described the combination of a platform, a cutter housing hinged to the platform, a pair of rotating shafts journaled in the housing, flexible rubber steadying wheels and circular cutters fastened to each shaft one over the other, the cutters on one shaft in the same horizontal plane with the cutters on the other shaft, the steadying wheels on one shaft in the same horizontal plane with the steadying wheels on the other shaft and means to deliver cane stalks to said wheels and cutters.

4. In a machine of the character described the combination of a platform, a cutter housing for the platform, a pair of rotating shafts in the housing, steadying wheels and circular cutters fastened to each shaft, a second pair of rotating shafts in the housing, feeder arms on the latter shafts, shield plates between each pair of shafts, a set of diverging gathering arms extending forwardly from each shield plate and a shoe connected to the forward end of each set of gathering arms.

5. In a machine of the character described the combination of a platform, a cutter housing hinged to the platform, cutters journaled in the housing, means to rotate the cutters, a ground cutter support adjustably connected to the platform and rotating ground cutters hinged to said support.

6. In a machine of the character described the combination of a platform, means to move the platform, a cutter housing hinged to the platform, rotating cutters in the housing, rotating feeder arms coacting with the cutters, a ground cutter support adjustably connected to the platform, a pair of sleeves hinged to the support, an arm extending from each sleeve, an electric motor with its armature shaft journaled in each arm and a ground cutter turned by each motor.

7. In a machine of the character described the combination of a platform, means to move the platform, a cutter housing hinged to the platform, a pair of shafts journaled in the housing, a motor on the housing, connections between the motor and said shaft, cutters on each shaft, a second pair of shafts journaled in the housing rotating with the rotations of the first pair and feeder arms on the second pair of shafts.

8. In a machine of the character described the combination of a platform, means to move the platform, a cutter housing connected to the platform, means to cut cane stalks in the housing, a ground cutter support connected to the platform, rotating ground cutters carried on the support, a pair of crowders each having a diverging front portion pivoted to the sides of the cutter housing and means to space the crowders different distances apart.

9. In a machine of the character described the combination of a platform, means to move the platform, a cutter housing connected to the platform, rotating cutters in the housing, rotating ground cutters supported below the platform, a pair of crowders each having a diverging front portion pivoted to the sides of the cutter housing, a tie rod connecting the rear portions of the crowder and a turn buckle in the tie rod to space the front portions of the crowders different distances apart.

10. In a machine of the character described the combination of a platform, a cutter housing connected to the platform, rotating cutters and rotating flexible steadying wheels in the housing, rotating ground cutters below the platform, a delivery tube in the housing, shield plates extending from an opening in the delivery tube, gathering arms extending from the shield plates, and an exhaust fan for the delivery tube.

11. In a machine of the character described the combination of a platform, a cutter housing connected to the platform, rotating cutters and steadying wheels in the housing, rotating ground cutters below the platform, a delivery tube in the housing, means to lead cut stalks to said tube, an adjustable fan housing having an outlet opening at the top end of the delivery tube, and an exhaust fan in the fan housing.

12. In a machine of the character described the combination of a caterpillar tractor, a motor to drive the tractor, a cutter housing hinged to the tractor, rotating cutters and steadying wheels in the housing, rotating ground cutters supported by the tractor and means to lead the material operated upon into the cutter housing.

13. In a machine of the character described the combination of a platform, a cutter housing connected to the platform, rotating cutters and rotating flexible steadying wheels in the housing, rotating ground cutters below the platform, a delivery tube having a vertical longitudinal intake opening in the housing, shield plates extending from said opening, gathering arms extending from the shield plates and exhaust means for the delivery tube.

14. In a machine of the character described the combination of a platform, a cutter housing hinged to the platform, rotating cutters in the housing, a ground cutter support hinged to the lower side of the platform and enabled to swing up and down, means to longitudinally move the support, longitudinal supporting arms in the support, oscillating sleeves for the supporting arms, an arm extending from each sleeve, rotating pivots journaled in each arm and a ground cutter fastened to each pivot.

15. In a machine of the character described the combination of a platform, a cutter housing hinged to the platform, rotating cutters in the housing, a ground cutter support hinged to the lower side of the platform, means to longitudinally move the support, and rotating ground cutters pivoted to the support enabled to follow the contour of the ground with the movements of the machine.

16. In a machine of the character described the combination of a platform, means to move the platform, a cutter housing connected to the platform, cutter appurtenances in the housing, a ground cutter below the platform, a pair of crowders each having a diverging front portion pivoted to the sides of the cutter housing and a tie rod with a turnbuckle connecting the rear ends of the crowders to adjust the diverging portions thereof.

17. In a machine of the character described the combination of a platform, a cutter housing hinged to the platform, a pair of shafts journaled in the housing, flexible steadying wheels and circular cutters superimposed one over the other on each of said shafts, rotating ground cutters below the platform, a delivery tube having a vertical longitudinal intake opening in the housing and exhaust means for tube, the said opening in the tube enabling portions of cane stalks cut by the cutters to enter the tube at the levels of the cutters.

Signed at the borough of Manhattan, city of New York, in the county of New York and State of New York, this 9th day of December, A. D. 1919.

GEORGE G. POWELL.